UNITED STATES PATENT OFFICE.

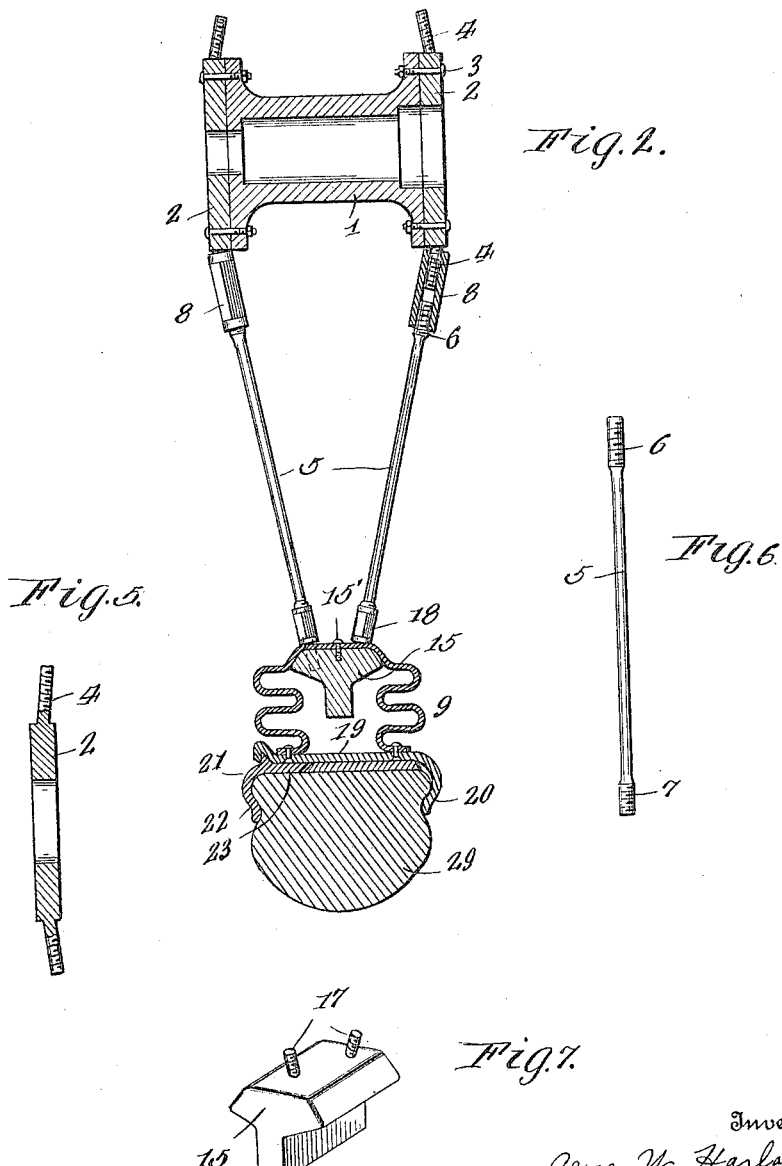

GEORGE W. HARLAN, OF OTTERVILLE, MISSOURI.

SPRING VEHICLE-WHEEL.

1,123,529.  Specification of Letters Patent.  Patented Jan. 5, 1915.

Application filed August 28, 1913. Serial No. 787,167.

*To all whom it may concern:*

Be it known that I, GEORGE W. HARLAN, a citizen of the United States, residing at Otterville, in the county of Cooper and State of Missouri, have invented certain new and useful Improvements in Spring Vehicle-Wheels, of which the following is a specification.

One of the objects of this invention is to provide a spring wheel which will afford the necessary resilience without the use of pneumatic tires, and wherein the means for affording such resilience is disposed radially outwardly from the hub so as not only to locate such means nearest the point or points of tread of the wheel, but also to arrange said means so that limited numbers of spokes, or even one or two, may have a relatively independent yielding action.

In the most improved embodiment of my invention I provide a resilient felly on the circumference of which the rim is mounted and to the interior of which the spokes are connected, said felly being subdivided for affording independent yielding action of its subdivisions.

My invention also resides in an improved construction of the rim whereby its attachment and detachment to and from the felly may be facilitated.

Other objects and features of the invention will be more fully described in connection with the accompanying drawings and will be more particularly pointed out in and by the appended claims.

Figure 1:
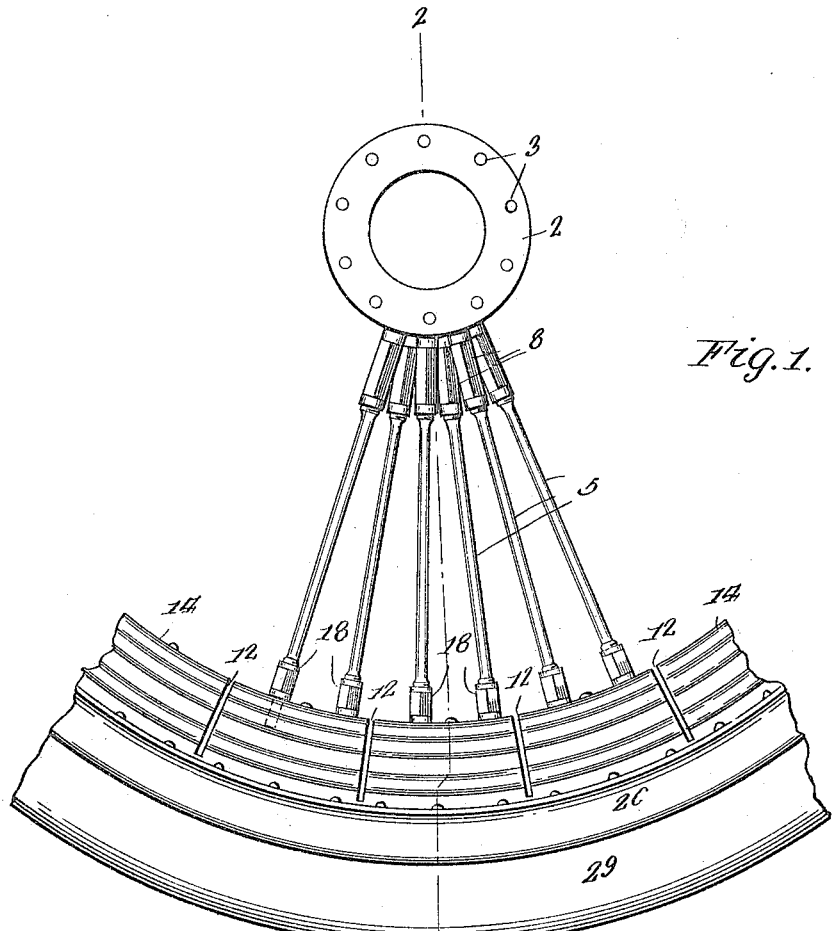
Figure 3:
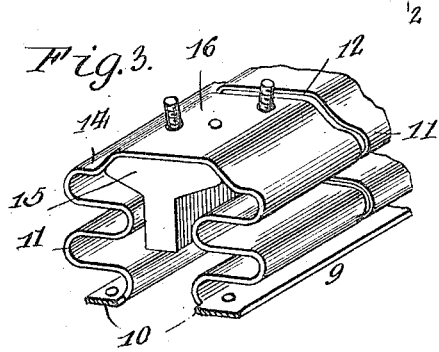
Figure 4:
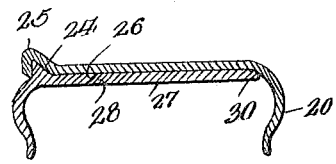

In the drawings:—Figure 1 is a view in side elevation of a portion of a spring wheel showing one form of my invention. Fig. 2 is a sectional view thereof on line 2—2 of Fig. 1. Fig. 3 is a perspective view of a portion of the felly. Fig. 4 is a sectional view of the rim. Fig. 5 is a sectional view of one of the hub spoke attaching rings. Fig. 6 is a view of one of the spokes. Fig. 7 is a perspective view of an abutment adapted for use in connection with the yielding felly.

Like characters of reference designate similar parts throughout the different figures of the drawings.

In the form of my invention herein shown, I have illustrated a hub 1 to the ends of which spoke rings 2 are secured, by means such as bolts 3. The rings 2 are provided with threaded spoke attaching studs 4, as is illustrated more clearly in Fig. 5.

Spokes are indicated at 5, and the same are shown as being provided with oppositely threaded ends, the inner ends 6 being slightly longer than the outer ends 7. Turn buckles or sleeves 8 are provided for adjustably connecting the inner ends 6 with the studs 4, and the latter are disposed at an angle to the rings 2 to provide for the proper outward radial convergence of the spokes from the hub 4 to the felly, as will be noted by reference to Fig. 2.

I have herein illustrated a felly, which is indicated as a whole at 9, consisting of a substantially channel-shaped annulus having integral or continuous peripheral rims 10, and provided with yielding or resilient portions which may take the form of corrugated side walls 11. It will thus be seen that that portion of the felly which is disposed radially inwardly of the peripheral rims 10 constitutes the yielding portion of the wheel, and in order to increase the yielding action and to provide for independently yielding movement for each spoke, as nearly as possible, the subdivided yielding or corrugated portions, as indicated at 12, are divided on lines which are substantially radial to the wheel center.

In order to limit yielding action of the subdivisions or felly sections, which may be designated at 14, I provide each section with an abutment 15 which may be T-shaped, the head portion being seated against the inner wall 16 and the tail portion projecting between the corrugations in a manner to engage the rim and prevent compression of the yielding sections, beyond a predetermined extent. The abutments 15 are shown secured to the walls 16 by means such as screws 15′. I provide the abutments 15 with threaded spoke-connecting studs 17 adapted to project through apertures in the sections 14, or rather the inner walls 16 thereof, so as to be coupled with the end 7 of the spokes by turn buckles or sleeves 18.

In the present construction I have shown two spokes connected to each yielding section, and the spokes thus connected are those which lie on opposite sides of the plane of the wheel. It will also be understood that the spokes will be made of substantially rigid material to wholly prevent flexure or bending so as to take up and neutralize strains that are imposed upon the wheel from different angles. Thus it will be seen that each pair of spokes will be provided with an independently yielding felly unit and that inasmuch as the spokes are connected with their unit, in somewhat spaced relation, it therefore follows that a slight rocking action of each section may be afforded to one of a pair of spokes with respect to the other. Also, to further afford independent action of the sections, the same are separated by a relatively considerable space on the lines of subdivision so as to prevent contact of the sections with each other and thereby retard independent action. Furthermore, by being subdivided, the initial stiffness resulting from the annular form is greatly lessened so as to correspondingly increase the resiliency of each section thereby not only providing for the independent action of the pairs of spokes but for a relatively limited independent action of each spoke of each pair with respect to the other of such pair.

The rim consists of a fixed rim portion 19 which is rigidly secured to the peripheral rims 10, by rivets or the like, on which is provided a tire clencher portion 20, on one side thereof. A demountable portion 21 is provided with a clencher portion 22 and a base flange 23, which latter is adapted to sit upon the rim 19. In order to lock the demountable rim to the fixed rim, I provide coacting locking portions, one of which may be a projection 24, on the demountable rim, and the other of which may be a hook-shaped portion 25, on the fixed rim. The inner edge of the demountable rim is beveled at 26, and I provide a filler ring 27, which is beveled at 28, to provide a continuously straight flat surface transversely of the rim on which the tire 29 may seat. The opposite side of the filler ring 27, is rounded, as at 30, to fit the interior of the clencher portion 20.

While I have shown a solid tire, as at 29, it will be understood that any form of tire may be used, and in cases where it is preferred to use a pneumatic tire, the resiliency of the wheel can be arranged to take up the major jolts or jars while the pneumatic tires can be relied upon for the minor jolts or jars, on uneven places in the roadbed. In case a solid tire is used, I may increase the resiliency of my improved felly so that it will be highly responsive to any jar or jolt however slight.

While I have herein shown and described one specific embodiment of my invention, I do not wish to be limited thereto, except for such limitations as the claims may import.

I claim:

1. A spring wheel comprising in combination a spring felly, a hub having detachable rings at the ends thereof, studs formed integrally with said rings and spokes connected to said felly and said studs formed on said rings.

2. A spring wheel comprising in combination a spring felly, spokes attached to said felly, a hub having detachable rings at the ends thereof, studs on said rings attached to said spokes, said studs being disposed at an angle to said rings, to provide the proper outward radial convergence of the spokes from said hubs.

In testimony whereof I affix my signature in presence of two witnesses.

GEORGE W. HARLAN.

Witnesses:
L. M. CORDRY,
S. T. SMITH.

Copies of this patent may be obtained for five cents each, by addressing the "Commissioner of Patents, Washington, D. C."